United States Patent [19]

Van der Schueren

[11] Patent Number: 5,120,550
[45] Date of Patent: Jun. 9, 1992

[54] CHEWING GUM COMPOSITION

[75] Inventor: Freddy M. L. Van der Schueren, Aalst, Belgium

[73] Assignees: Cerestar Holding BV, Belgium; Cerestar Holding BV, Belgium

[21] Appl. No.: 620,007

[22] Filed: Nov. 30, 1990

[30] Foreign Application Priority Data

Nov. 30, 1989 [GB] United Kingdom ............ 8927130

[51] Int. Cl.$^5$ .................................. A23G 3/30
[52] U.S. Cl. .................................. 426/3; 426/658; 426/548; 426/804
[58] Field of Search .................. 426/3-6, 426/548, 658, 804

[56] References Cited

U.S. PATENT DOCUMENTS

| | | | |
|---|---|---|---|
| 2,251,070 | 7/1941 | Schantz | 426/3 |
| 4,346,116 | 8/1982 | Verwaerde et al. | 426/48 |
| 4,883,685 | 11/1989 | Kondou | 426/548 |
| 4,886,677 | 12/1989 | Kondou | 426/548 |
| 4,888,183 | 12/1989 | Kondou | 426/548 |
| 4,986,991 | 1/1991 | Tatka et al. | 426/3 |

FOREIGN PATENT DOCUMENTS

| | | | |
|---|---|---|---|
| 0009325 | 8/1979 | European Pat. Off. | |
| 0323442 | 7/1989 | European Pat. Off. | 426/3 |
| 0325090 | 7/1989 | European Pat. Off. | 426/3 |
| 2053651 | 6/1980 | United Kingdom | |

OTHER PUBLICATIONS

English Translation of Japanese Patent SHO 64-50145 date: Aug. 21, 1987.
European Search Report.

*Primary Examiner*—Jeanette Hunter
*Attorney, Agent, or Firm*—Cushman, Darby

[57] ABSTRACT

A chewing gum composition which contains as sweetening agent a mixture of erythritol and a liquid sugar or liquid sugar alcohol other than erythritol e.g. a hydrogenated starch hydrolysate with a DE between 20 and 50, the amount of erythritol in the sweetening agent mixture being more than 60 weight %.

12 Claims, No Drawings

CHEWING GUM COMPOSITION

The present invention relates to a chewing gum composition, in particular to a non-cariogenic and non-caloric sweetening agent for such a composition.

Chewing and bubble gums conventionally consist of two basic portions which may be termed gustatory and masticatory. The gustatory portion provides sweetness and flavour and the masticatory portion or gum the viscoelastic properties essential to the "chewability" of the gum. In addition the chewing gum may contain other components such as humectants, plasticisers and anti-sticking agents.

A chewing gum will contain about 25% to 85% by weight of sweetener and about 5% to 55% by weight gum. The nature of the sweetener is therefore very important because it is present in such an amount that apart from its sweetness it will have a significant effect on other properties of the chewing gum eg. its mouth feel and storage stability. For example, sorbitol and dextrose, both of which are commonly used sweeteners tend to crystallise as the chewing gum loses water on storage. As a result, the chewing gum develops a crystalline or "grainy" texture.

Recently, the increased emphasis on health care has had an effect on chewing gum formulations since a product which contains up to 75% by weight sucrose or dextrose has a high caloric count and is cariogenic. In consequence, chewing gum formulations have been developed which use sweeteners which are either non-caloric or non-cariogenic or which possess both of these desirable attributes.

Japanese patent publication Sho 64-51045 (application Sho 62-207798) contains a description of a process for the production of a chewing gum which is characterised by three steps. In the first step a saccharide mixture containing 30 to 60 weight % meso-erythritol (hereinafter "erythritol") and a saccharide selected from sugars and sugar alcohols (excluding erythritol) is melted. The molten mixture is mixed in the second step with a gum base at between 100° C. and 130° C. and in the third step the mixture is cooled and solidified. Erythritol is non-caloric and non-cariogenic and the sugar or other sugar alcohol is also selected for these properties, examples being palatinose, isomaltose, sorbitol, maltitol and xylitol. Glucose and sucrose may be used but in this case the composition cannot be said to be non-caloric or non-cariogenic although the caloric and cariogenic values of these sugars are reduced.

According to Japanese patent publication Sho 64-51045 when the grains of sugar powder in a chewing gum exceed 50 microns the chewing gum has an abrasive sensation in the mouth and is therefore unsatisfactory. The process of the Japanese patent publication has the aims therefore of producing fine crystals of sweetener for the chewing gum without the need to employ a mechanical process to pulverise the sweetener to the desired particle size.

It is said in the Japanese patent publication that the amount of erythritol in the mixture of erythritol and sugar or other sugar alcohol must be in the range 30 to 60 weight %, preferably 30 to 50 weight % otherwise the chewing gum is unacceptable. Less than 30 weight % erythritol and the chewing gum has too little elasticity, becomes highly hygroscopic and too soft to chew. Above 60 weight % the chewing gum produced contains erythritol crystals larger than 50 microns with the consequent abrasive sensation on chewing.

Erythritol has a melting point of 126° C. and in the solid state is white and highly crystalline and has a sweetness which is approximately 70% that of sucrose. Being non-caloric and non-cariogenic erythritol is a very attractive sweetener and it is a very desirable aim therefore to maximise the content of erythritol in a chewing gum which relies upon the compound to confer non-caloric and non-cariogenic sweetness.

We have now found that it is possible to formulate a chewing gum with satisfactory properties and which uses as sweetener an agent containing more than 60% by weight erythritol provided that certain conditions are fulfilled.

Accordingly, the invention is a chewing gum composition comprising a gum and a sweetening agent in which the sweetening agent comprises a mixture of erythritol and a liquid sugar or other sugar alcohol, the amount of erythritol in the mixture being more than 60 weight % and preferably 65 to 90 weight %.

The sugar, or sugar alcohol other than erythritol, used in the sweetening agent is liquid under the conditions of production of the chewing gum ie at a temperature above about 40° C. and should also be non-crystallising at this temperature. For this reason, instead of using a single sugar or sugar alcohol it is preferred to use mixtures of such compounds which exist as liquid syrups and which have a very small tendency to crystallise. Suitable mixtures are obtained when starch is hydrolysed to a mixture of glucose oligomers characterised by their so-called dextrose equivalent or DE numbers, the higher the DE number the lower the average molecular weight of the oligomers in the mixture. For the present invention hydrolysates with DE values of 20 to 50 are very suitable. The starch hydrolysates may also be hydrogenated so that their content of sugars is converted to the equivalent sugar alcohols. Such mixtures are more preferable for use in the chewing gum formulations according to the present invention because, unlike their parent unhydrogenated starch hydrolysates, they are of very low cariogenicity.

The chewing gum composition according to the present invention may contain 5 to 55 weight % gum base and 25 to 85 weight % sweetening agent. The gum base may be chosen from gums conventionally used for this purpose eg. natural or synthetic resins such as chicle, natural rubber, guttapercha, lechi caspi, sorva, guttakay, crown gum, butadiene-styrene copolymers, polyisobutylene, isobutylene-isoprene copolymers, polyvinyl acetate and polyvinyl alcohol. In addition to the two basic components the chewing gum may also contain a softener or plasticiser eg. lanolin, propylene glycol, glycerine or triacetin in amounts up to 10 weight %, a filler eg. calcium carbonate, magnesium carbonate, alumina and talc in amounts up to 20 weight %, an anti-sticking agent, eg. mannitol and a flavouring. Suitable flavourings include mint and a variety of fruit flavours. Other ingredients conventionally used in chewing gum formulations may also be used in the compositions according to the present invention including small amounts of high intensity sweeteners such as saccharin and aspartame.

Chewing gum compositions which do not have a grainy texture but in which the sweetening agent comprises more than 60% erythritol may be produced by the following method in which the temperature of operation is a critical factor.

The gum base is first warmed to the lowest temperature at which it is dough-like and workable eg. between 40° and 80° C. particularly between 50° and 70° C. and it is then subjected to a kneading action. While still kneading, the erythritol and sugar or other sugar alcohol are slowly and gradually introduced to the gum. Suitably, the liquid sugar or other sugar alcohol is first blended with the gum base and the erythritol crystals are added separately and in portions, a time being allowed between the addition of each portion to ensure thorough mixing. Other ingredients eg. glycerine and flavour may be added in a similar manner, usually after the gum and part of the erythritol have been blended or after the blending of all of the erythritol. We have found that under these conditions of preparation it is possible to use crystalline erythritol of particle size greater than 50 microns without producing the "grainy" product described in Japanese patent publication Sho 64-51045. Particle sizes as high as 300 microns may be used and up to 30 weight % of the erythritol may be above this figure although it is generally preferred that substantially all of the erythritol has a particle size less than 300 microns and in practice when at least 65 weight % of the particles are between 100 and 300 microns a very satisfactory product is obtained. Although not wishing to be bound in any way by the following theory we believe that careful blending of the gum and sweetening agent at low temperatures enables larger particles of erythritol to be used because subsequent recrystallisation of the erythritol in the finished gum is avoided. Chewing gum production techniques in which higher blending temperatures are used, while facilitating the blending process, have the disadvantage that on cooling, erythritol in solution in the water present in the gum either recrystallises and/or deposits on existing crystals so leading to an undesirable increase in crystal size. Although the chewing gum compositions according to the present invention do contain water eg 2 to 12 weight % generally associated with the liquid sugar or other sugar alcohol in the sweetening agent, the low temperature at which the chewing gum is prepared minimises the solution and recrystallisation of the erythritol. As already mentioned, the temperature of blending should be maintained as low as possible commensurate with efficient blending of the ingredients bearing in mind that both gum and liquid sugar or other sugar alcohol increase greatly in viscosity as the temperature is reduced.

A chewing gum composition according to the present invention and the process for its preparation are illustrated in the following Example

EXAMPLE

The gum base used was a commercial synthetic resin and comprised 29.2 weight % of the composition.

The sweetening agent amounted to 68 weight % of the composition. The sweetening agent itself consisted of 81 weight % erythritol crystals and 19 weight % of a hydrogenated starch hydrolysate which comprised:

| | |
|---|---|
| DP1 | 2.5 weight % dry solids |
| DP2 | 75 weight % dry solids |
| DP3 | 22.5 weight % dry solids |
| water | 25-26 weight % |

DP refers to the relevant oligomer, eg DP2 is maltitol DP1 sorbitol.

The particle size of the erythritol was:

| | |
|---|---|
| >300 μm | 6% |
| >200 μm | 23% |
| >100 μm | 55% |
| >50 μm | 12% |
| <50 μm | 4% |

The chewing gum composition also contained 2.0 weight glycerine and 0.8 weight % mint oil.

The chewing gum was prepared by:
1) Heating the gum base to 60° C. and starting to knead.
2) While still kneading adding the hydrogenated starch hydrolysate.
3) Adding one third of the erythritol and kneading for 6 minutes.
4) Adding one half the glycerine and kneading for 1 minute.
5) Adding the second third of the erythritol and kneading for 6 minutes.
6) Adding the second half of the glycerine and kneading for 1 minute.
7) Adding the third part of the erythritol and kneading for 6 minutes.
8) Discharging the chewing gum and cooling.

The chewing gum prepared as above had an appearance, chewability, texture and stability as good as commercially available products there being no graininess in its texture. The flexibility of the gum was still excellent after three months storage.

I claim:

1. A chewing gum composition which contains as sweetening agent a mixture of erythritol and a liquid sugar or liquid sugar alcohol other than erythritol comprising hydrogenated starch hydrolyzate of DE between 20 and 50, the amount of erythritol in the mixture being more than 60 weight percent.

2. A chewing gum composition according to claim 1 in which the amount of erythritol in the mixture is 65 to 90 weight percent.

3. A composition according to claim 1 in which the composition comprises 5 to 55 weight percent gum base and 25 to 85 weight percent sweetening agent.

4. A composition according to claim 1 which also contains glycerin.

5. A process for producing a chewing gum as claimed in claim 1 which comprises
   (a) heating a gum base to a temperature not exceeding 80° C. so that the gum is kneadable and
   (b) kneading said base and slowly adding erythritol crystals and said liquid sugar or liquid sugar alcohol other than erythritol thereto.

6. A process as set forth in claim 5 in which the temperature to which the gum base is heated does not exceed 70° C.

7. A process for producing a chewing gum as set forth in claim 1 which comprises
   (a) heating a gum base to a temperature not exceeding 80° C. so that the gum is kneadable,
   (b) kneading said base and adding said liquid sugar or liquid sugar alcohol other than erythritol and subsequently,
   (c) while continuing kneading, slowly and gradually adding erythritol crystals thereto.

8. A process as set forth in claim 7 in which the temperature to which the gum base is heated does not exceed 70° C.

9. A process according to claim 5, claim 6, claim 7 or claim 8 in which the erythritol is added in portions.

10. A process according to claim 5, claim 6, claim 7 or claim 8 in which other ingredients are also added gradually after the gum and at least part of the erythritol have been blended.

11. A process as set forth in claim 10 in which the other ingredients include glycerin.

12. A process according to claim 5, claim 6, claim 7 or claim 8 in which at least 65% of the erythritol added has a particle size in the range 100 to 300 microns.

* * * * *